United States Patent [19]

Serra et al.

[11] 3,958,221
[45] May 18, 1976

[54] METHOD AND APPARATUS FOR LOCATING EFFECTIVE OPERAND OF AN INSTRUCTION

[75] Inventors: John J. Serra, Monroe; Ronald T. Prodan, Shelton, both of Conn.

[73] Assignee: Bunker Ramo Corporation, Oak Brook, Ill.

[22] Filed: June 7, 1973

[21] Appl. No.: 367,756

[52] U.S. Cl. ............................................. 340/172.5
[51] Int. Cl.² ...................... G06F 9/18; G06F 9/20
[58] Field of Search ................................. 340/172.5

[56] References Cited
UNITED STATES PATENTS

| | | | |
|---|---|---|---|
| 3,302,183 | 1/1967 | Bennett et al. | 340/172.5 |
| 3,422,404 | 1/1969 | Ferguson | 340/172.5 |
| 3,599,186 | 8/1971 | May et al. | 340/172.5 |
| 3,654,621 | 4/1972 | Bock et al. | 340/172.5 |
| 3,657,705 | 4/1972 | Mekota, Jr. et al. | 340/172.5 |

Primary Examiner—Harvey E. Springborn
Assistant Examiner—Michael C. Sachs
Attorney, Agent, or Firm—William Lohff; F. M. Arbuckle

[57] ABSTRACT

This invention relates to a method and apparatus for determining the address mode of each instruction in a microprogrammed processor, and for utilizing the address mode determination to locate the effective operand of the instruction. A microprogram memory is included which contains microprogram micro-orders for controlling the obtaining of the effective operand for an instruction in each of the address modes. The address being accessed in the microprogram memory at any given time is stored in a microprogram register. There is a decoder which is operative in response to the address mode tag of an instruction for generating the address of the entry point in the microprogram memory for the microprogram micro-orders to be utilized to control the obtaining of the effective operand for the mode indicated by the tag. The address mode tag of each instruction is applied to the decoder and the microprogram entry point address read out from the decoder in response to the tag is stored in the microprogram register. The storing of the entry point address in the microprogram register initiates the execution of the microprogram micro-orders for the indicated mode, the micro-orders controlling the obtaining of the desired effective operand. The decoder means may also be utilized to obtain a starting address for the operation code microprograms, the operation code being applied to the decoder after the address tag and the resulting starting address being stored in a temporary register until execution of the required micro-orders of the address mode microprogram has been completed.

7 Claims, 3 Drawing Figures

METHOD AND APPARATUS FOR LOCATING EFFECTIVE OPERAND OF AN INSTRUCTION

This invention relates to a method and apparatus which may be utilized in a microprogrammed processor for determining the address mode of an instruction and for utilizing the address mode determination to locate the effective operand of the instruction.

BACKGROUND OF THE INVENTION

In a microprogrammed processor, each instruction is executed by accessing a subroutine of elemental instructions, each of the instructions being called a micro-order. When the sequence of micro-orders for a given instruction is completed, the processor branches to a subroutine (fetch microprogram) which causes the next instruction to be fetched. The sequence of micro-orders making up each subroutine is called a microprogram, there being a separate microprogram associated with each instruction.

An instruction generally consists of two parts, an operation code and an operand address. In some machines, however, the operand address may be utilized in different ways in order to obtain the effective operand of the instruction depending on an addressing mode of the instruction. The addressing mode of the instruction is indicated by the operation code, normally being indicated by an address mode tag which is formed from the least significant bits (LSBs) of the operation code. The number of bits which are utilized for the tag will depend on the number of different address modes available in the processor. For example, for a system having up to eight different address modes the tag would be formed of the three LSBs of the operation code.

While a given processor may have any one of a variety of different address modes, the following is a list of typical address modes in a microprogrammed processor:

1. Direct Mode-a two word instruction where the second word contains the LSBs of the address where the effective operand is stored, the most significant bits (MSBs) of the address being the sector address presently stored in the processor program counter.
2. Direct Mode Zero Sector-same as 1 above except that the address in the second word is in the Zero (first) sector of memory.
3. Indirect Mode-same as 1 above except that the memory location indicated by the address in the second word contains an address where the effective operand is stored rather than the operand itself.
4. Indirect Mode Zero Sector-same as 3 above except that the address in the second word is located in the Zero (first) sector of the memory.
5. Immediate Mode-a two word instruction where the second word contains the effective operand.
6. Single Word Mode-this is a one word instruction which does not have an effective operand (for example increment accumulator).
7. Triple Word Mode-this is a three word instruction where the second and third words contain the total operand address. (i.e. both the sector address and the address within the sector).

Heretofore, at least four different methods have been utilized for finding the effective operand from the address mode tag and instruction operand. These methods have been:

1. Including the addressing mode phase of the fetch into the execution phase of each instruction. This requires that a set of address mode routines be provided for each operation code microprogram with the microprogram being entered at the beginning of the appropriate address mode routine associated with the instruction operation code microprogram, and there being a branch from the end of each address mode routine into the operation code portion of the microprogram.
2. Breaking a single instruction into several instructions, each one representing a different addressing mode. In this instance, there is a separate microprogram for each operation code in each of the different address modes in which it may be utilized. Thus, for example, if the processor has seven address modes, there would be seven microprograms stored for each operation code.
3. Same as 2 above except that all addressing modes are not included for all instructions.
4. Provide one central fetch routine and test and branch on the tag bits to obtain the proper address mode.

It is apparent that each of the techniques described above has certain limitations. Methods 1 and 2, (particularly method 2) cause a significant increase in the size requirement for the microprogram memory. Method 3 also results in an increase in the memory requirement on the microprogram memory and has the further disadvantage of diminishing the flexibility of the processor. While method 4 does not increase the microprogram memory requirements, and does provide complete flexibility, the requirement of successive tests and branch instructions for up to three encoded tag bits results in a number of microprogram memory cycles being required to select the proper address mode for each instruction. This significantly reduces the processor's speed and capacity.

A need thus exists for a method and apparatus to perform the address mode determination and effective operand selection functions which method does not require an increase in the size of the microprogram memory, permits all addressing modes to be included for all instructions, thus providing complete processor flexibility, and which permits the address mode determination to be performed in no more than one microprogram instruction time.

SUMMARY OF THE INVENTION

In accordance with the above, this invention provides a method and system for determining the address mode of each instruction in a microprogram processor, each instruction including an operation code, an addres mode tag, and an operand, for utilizing the address mode determination to locate the effective operand of the instruction. The system includes a micro-program memory containing microprogram micro-orders for controlling the obtaining of the effective operand for an instruction in each of the address modes. A means is also provided for controlling the sequential reading out of micro-orders of each microprogram, the controlling means including a micro-program register. There is a decoder means operative in response to the address mode tag of an instruction for generating the address of the entry point in the microprogram memory of the microprogram micro-orders to be utilized to control the obtaining of the effective operand for the mode indicated by the tag. The address mode tag of each instruction is applied by a suitable means to the decoder and the microprogram entry point address read out from the decoder in response to the tag is applied by a suitable means to the microprogram register. The storing of the entry point address in the microprogram register initiates the execution of the microprogram micro-orders for the indicated mode, the micro-orders controlling the obtaining of the desired effective operand.

For a preferred embodiment of the invention, the decoder means is also utilized to obtain the starting address for the operation code microprogram, the operation code being applied to the decoder means after the address tag and the resulting starting address being stored in a temporary register until execution of the address mode microprogram has been completed.

The foregoing and other objects, features and advantages of the invention will be apparent from the following more particular description of a preferred embodiment as illustrated in the accompanying drawings.

DETAILED DESCRIPTION

Figure 1:
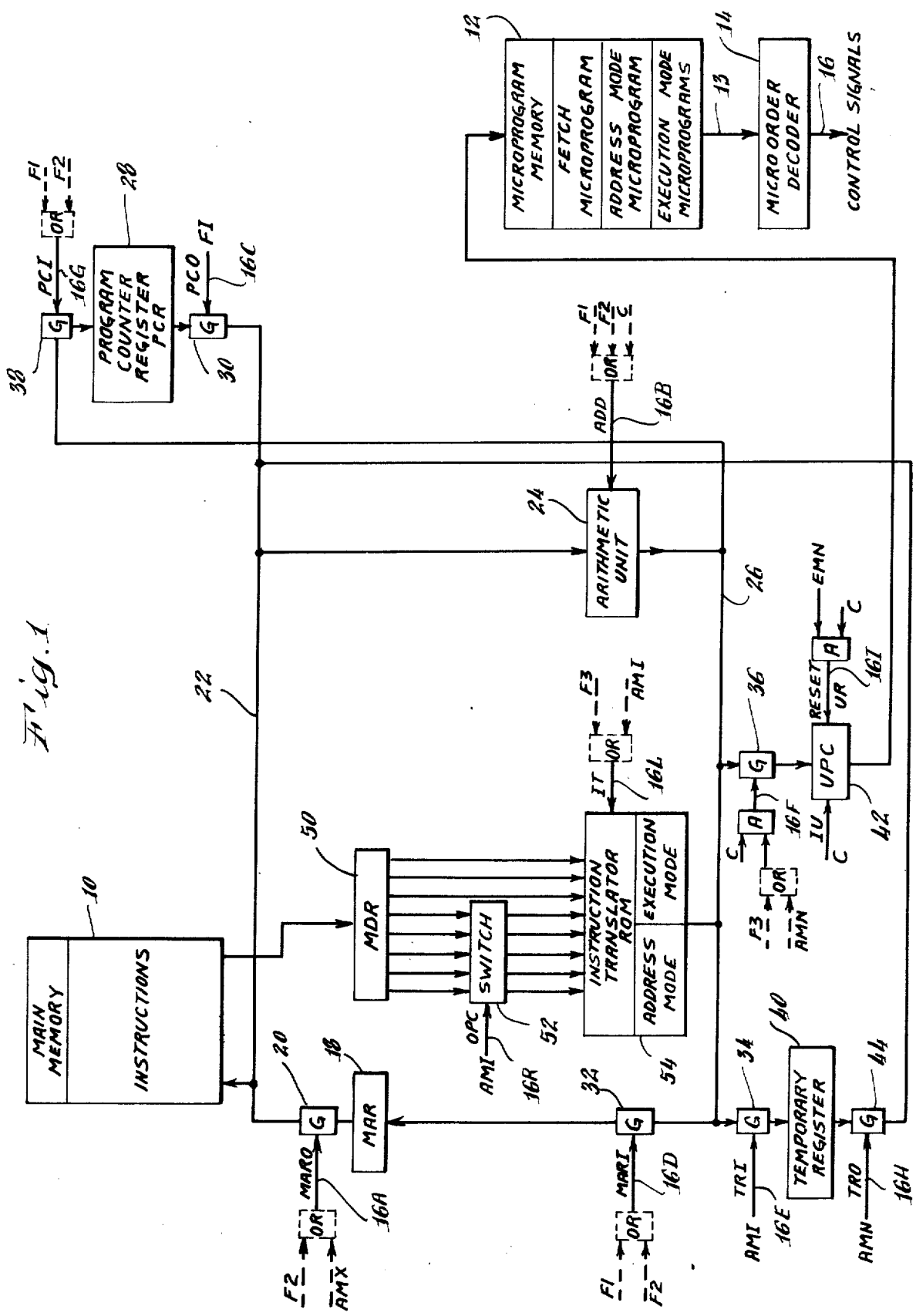
FIG. 1 is a schematic block diagram of a preferred embodiment of the invention.

Referring now to FIG. 1, the portion of a microprogrammed processor of a preferred embodiment of the invention which is utilized in making the address mode determination and in performing related functions is shown. The processor includes a main memory 10 in which instructions to be executed are stored, and a microprogram memory 12. A microprogram which is utilized for fetching instructions from memory 10 (fetch microprogram) is stored starting at address zero in memory 12. Following the fetch microprogram in memory 12 is an address mode microprogram. The address mode microprogram has several entry points and several branch or exit points, with entry point into the address mode microprogram being provided for each address mode. There would normally be a separate entry point into the address mode microprogram for each address mode, although in some instances, the same entry points may be utilized for two or more modes. The remainder of memory 12 contains the various execution mode microprogram of the processor.

As indicated previously, each microprogram is made up of a sequence of micro-orders. As each micro-order is read out from memory 12, on lines 13, it is applied to micro-order decoder 14. If it is assumed that memory 12 is a solid state read-only memory, then outputs can be considered to continuously appear on lines 13 so long as an address input is applied to the memory. Decoder 14 generates selected control signals on lines 16, in response to the bits or combination of bits of the micro-order. For maximum flexibility, each line 16 controls a particular function, with the micro-order being decoded to determine if it requires a particular function and a signal appearing on the line if the function is required. With this mode of operation, the function performed at a given point in a microprogram may be easily changed by merely changing the micro-order stored at that point. For an alternative, but less flexible, mode of operation, decoder 14 decodes the instruction number, for example the first instruction of the fetch routine, and the lines corresponding to each instruction are hard wired to the various points in the circuit where they are utilized. FIG. 1 illustrates both modes of operation by showing various control lines and also illustrating the instructions which cause signals to appear on the lines for the preferred embodiment of the invention. Since the orders and the related OR gates are optional and would not normally be utilized for the preferred embodiment of the invention, these lines and elements have been shown dotted.

Main memory 10 is accessed under control of a memory address register (MAR) 18, address inputs to the memory being applied through a gate 20 which is energized by an MARO control signal on line 16A from decoder 14. For purposes of illustration, it is seen that, for the preferred embodiment, the MARO signal is generated for the second instruction of the fetch microprogram (F2) and for a selected X instruction of an address mode routine (AMX). The output from gate 20, in addition to accessing memory 10, is also applied to a main bus 22. Signals on bus 22 are applied as the information inputs to an arithmetic unit 24, the output from which is applied to an output bus 26. An Add 1 control signal may be applied to arithmetic unit 24 through line 16B. For the preferred embodiment of the invention, signals are applied to line 16B during micro-orders F1 and F2 times.

The system also includes a program counter register (PCR) 28 the output from which is applied through a gate 30 to main bus 22. Gate 30 is enabled by a PCO signal on line 16C. For the preferred embodiment, a signal appears on line 16C at F1 time.

Output bus 26 is connected as an information input to gates 32, 34, 36, and 38. Gate 32 passes the signals on bus 26 to MAR 18 and is enabled by an MARI control signal on line 16D. For the preferred embodiment, signals appear on line 16D at F1 and F2 times. Gate 34 passes the signals on bus 26 to a temporary register (TEMP REG) 40. Gate 34 is enabled by a TRI control signal on line 16E, a signal appearing on this line during the first micro-order of the address mode microprogram which is executed for each address mode (AMI time). Gate 36 passes the signals on bus 26 to a microprogram counter or register (UPC) 42. Gate 36 is enabled by a UI control signal on line 16F, a signal appearing on this line, for the preferred embodiment of the invention, at C time during the F3 micro-order or during the last micro-order of the address mode microprogram to be executed for each address mode (AMN time). Clock time C is the time at which a new micro-order is caused to appear at the output from memory 12. Gate 38 passes the signals on line 26 to PCR 28 and is enabled by a PCI signal on line 16G. For the preferred embodiment of the invention, a signal appears on line 16G during F1 and F2 times.

An output from TEMP REG 40 is applied through gate 44 to main bus 22, gate 44 being conditioned by a TRO control signal on line 16H. A signal appears on line 16H at AMN time. The contents of UPC 42 are continuously applied to address and cause a read out from microprogram memory 12. UPC 42 may also be reset by a UR signal on line 16I and incremented by an IU signal on line 16J. For a preferred embodiment of the invention, a signal appears on line 16I during C time of the last micro-order of each execution mode microprogram (EMN time) and a signal appears on line 16J at each C time.

Figure 3:
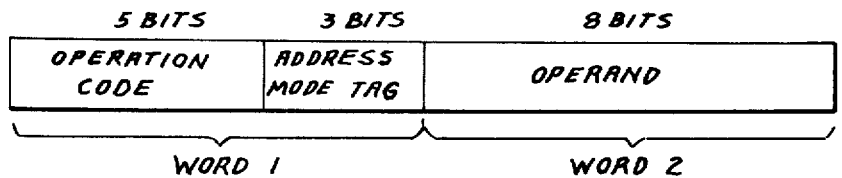
FIG. 3 is a diagram illustrating the instruction format for a preferred embodiment of the invention.

Instructions read out from memory 10 are stored in memory date register (MDR) 50. The format for an exemplary instruction stored in memory 10 is shown in FIG. 3. The instruction is contained in two eight bits words, the total instruction thus being 16 bits. The first five bits of the first word contain the operation code and the next three bits the address mode tag. The second word, containing the last eight bits of the instruction, stores the instruction operand. The output lines from the five bit positions of MDR containing the operand code are applied through a switch 52 to an instruction translator or decoder 54, of conventional design while the output lines from the three tag bits in MDR are applied directly to translator 54. Translator 54 may, for example, be read only memory (ROM). Switch 52 is enabled or turned on by an OPC control signal on line 16R a signal appearing on this line for the preferred embodiment at AM1 time. The first eight address positions in translator 54 contain the entry point addresses for the various address modes in the address mode microprogram in memory 12, while the remainder of the translator contains the starting addresses in memory 12 of the execution mode microprograms. Translator 54 is enabled by an IT control signal on line 16L, a signal appearing on line 16L for the preferred embodiment of the invention at F3 and AMI times. Outputs from translator 54 are applied to output bus 26.

OPERATION

Figure 2:
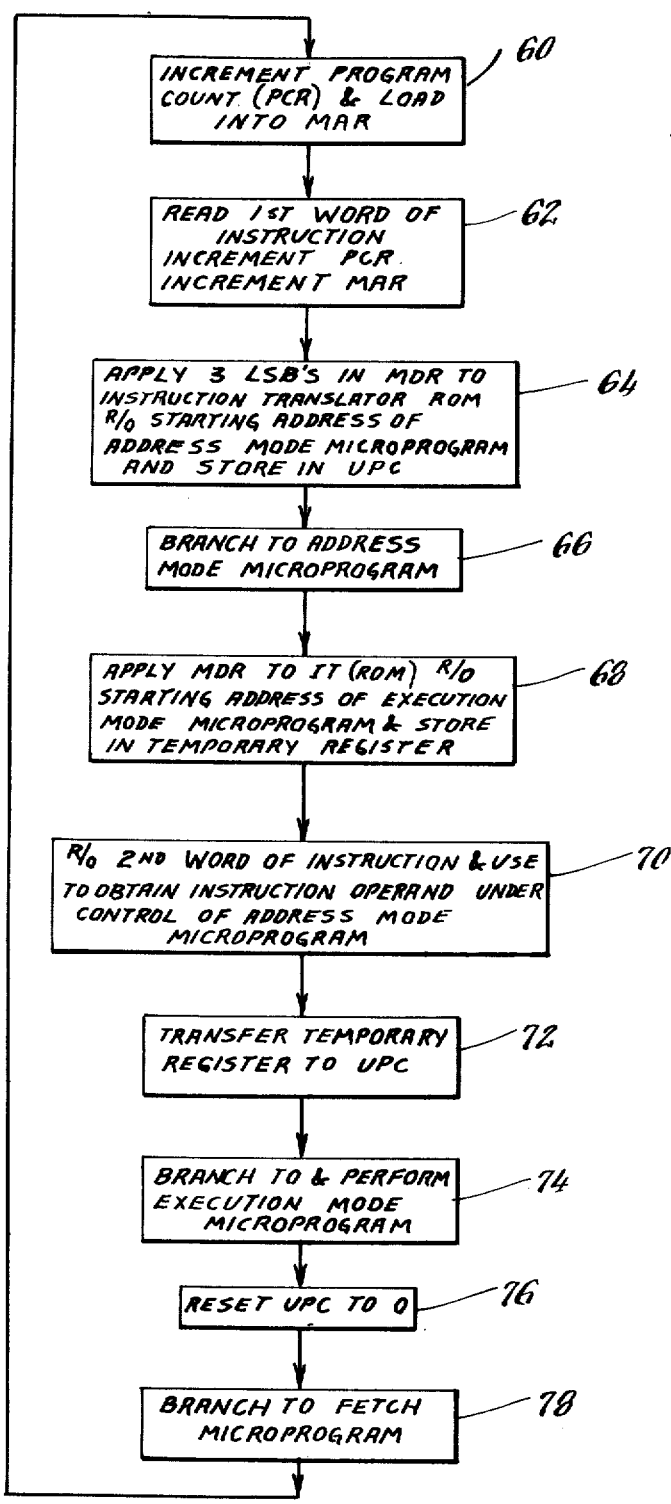
FIG. 2 is a flow diagram illustrating the operation of a preferred embodiment of the invention.

FIG. 2 is a flow diagram illustrating the various steps involved in performing an address mode determination and related functions with the system shown in FIG. 1. Assume initially that all registers and counters except PCR are set to zero, PCR containing the address of the next instruction in memory 10 which is to be executed. UPC 42 being set to zero means that the microprogram being performed is the fetch microprograms. The zero address being applied to microprogram memory 12, causes the F1 micro-order to be read out to micro-order decoder 14.

The F1 micro-order in decoder 14 causes a signal to appear on PCO line 16C, conditioning gate 30 to pass the program count in PCR 28 through bus 22 to arithmetic unit 24. A signal also appearing on ADD-1 line 16B at this time causes the address to be incremented and applied through output bus 26 and conditioned gates 32 and 38 to MAR 18 and PCR 28 respectively. The address of the next instruction to be fetched is thus loaded into MAR and the count in PCR updated. Step 60 (FIG. 2) is in this manner performed.

At the next C clock time, IU line 16J has a signal applied thereto, incrementing UPC 42 to the address of the second fetch micro-order (F2). The second instruction of the fetch routine is thus read out into decoder 14. The decoding of the F2 micro-order causes a signal to appear on MARO line 16A conditioning gate 20 to pass the address in MAR 18 to main memory 10, causing the instruction at the indicated address to be read out into MDR 50. The contents of MAR 18 are also applied through bus 22 and arithmetic unit 24, where the address is incremented by one under control of a signal on ADD-1 line 16B, to output bus 26. The incremented address on output bus 26 is applied through conditioned gates 32 and 38 to be stored in MAR 18 and PCR 28. The address of the second word of the instruction, the word containing the instruction operand, is thus stored in both MAR and PCR. The operations indicated for step 62 of FIG. 2 are thus performed.

At the next C clock time, UPC 42 is again incremented, causing the third instruction of the fetch routine to be read out into micro-order decoder 14. Under control of the F3 micro-order, a control signal is applied to IT line 16L enabling instruction translator 54. However, since switch 52 is not enabled at this time, only the three LSBs in MDR 50, which bit positions contain the address mode tag, are applied to translator 54 at this time. In response to the application of the address tag, translator 54 generates an output which represents the address in memory 12 which is the entry point for the address mode microprogram for the address mode indicated by the tag in the instruction. The address outputted from circuit 54 is applied through output bus 26 to gate 36. At the next C clock time, gate 36 is conditioned to store the address microprogram entry point address applied thereto in UPC 42. Micro-order decoder 14 is designed so that the existence of a signal on UI line 16F inhibits the generation of a signal on IV (increment) line 16J to prevent the entry point address stored in the UPC from being incremented. In the alternative, the UPC may be a counter of the type where an information input overides a simultaneously received increment input. The operations indicated under step 64 in FIG. 2 are thus performed.

The entry point address in UPC 42 causes the first micro-order for the selected address mode in the address mode microprogram to be applied to micro-order decoder 14. The branch to the address mode microprogram (step 66) is thus effected.

During the first micro-order of the address mode microprogram for each address mode, a signal appears on OPC line 16R, enabling switch 52 to apply the five MSBs stored in MDR 50, the bits of the operation code, to translator 54. Translator 54 is also enabled at this time by an IT signal on line 16L. This results in the address of the first micro-order of the required execution mode microprogram being read out onto output bus 26. The decoding of the AM1 micro-order also causes a signal to appear on TRI line 16E, enabling gate 34 to pass the address on output bus 26 into temporary register 40. The operations indicated in step 68 of FIG. 2 are thus performed.

The remaining operations which are performed under control of the address mode microprogram will vary with the address mode and the exact nature of these operations do not form part of the present invention. No attempt will therefore be made to describe these operations in detail. However, it is noted that in almost every instance, the second or third micro-order of the address microprogram which is executed will cause a signal to be applied to MARO line 16A, conditioning gate 20 to cause the second word of the instruction, the word containing the operand, to be read out into MDR 50. Step 70 of FIG. 2 is thus performed.

The last step of the address mode microprogram, regardless of the instruction address mode, conditions the system to branch to the proper execution mode microprogram. This is accomplished, as indicated by step 72, by transferring the address in temporary register 40 to UPC 42. To accomplish this, when the last instruction of the address mode microprogram is read into micro-order decoder 14, a TRO control signal appears on line 16H, conditioning gate 44 to pass the address in temporary register 40 to main bus 22. This address is then passed through arithmetic unit 24 and output bus 26 to gate 36, gate 36 being conditioned at the next C clock time to store the address in UPC 42. It is noted that AMN is not one of the conditions which causes a signal to appear on ADD-1 line 16B. Thus, the address from the temporary register passes through the arithmetic unit unchanged. The desired transfer of the first address of the execution mode microprogram from TEMP REG 40 to UPC 42 is thus effected.

The loading of the execution mode microprogram address into UPC 42 causes the first micro-order of the execution mode micro-program to be read into micro-order decoder 14. The micro-orders of the execution mode microprogram are then read-out and performed in sequence (step 74) until the last micro-order of the micro-program is reached. At the C clock time at the end of the execution of this micro-order, micro-order EMN, a signal appears on UR line 16I causing the contents of UPC 42 to be reset to zero (step 76). As was previously indicated, the zero address in microprogram memory 12 contains the first micro-order of the instruction fetch microprogram. Thus, a branch to the fetch microprogram (step 78) occurs, causing the operation to return to step 60 to perform the operations indicated under control of the F1 micro-order.

A system has thus been provided which determines the address mode for an instruction in a microprogrammed processor, and branches to a proper entry point in a microprogram for performing the address mode functions in one microprogram memory instruction time while requiring only a single multiple entry point microprogram to be stored for the address mode functions and a single microprogram to be stored for each execution operation code. Finally, the system provides full flexibility, each instruction being performable in all of the address modes.

In the discussion above, details have not been provided for such functions as the reading out of micro-orders from micro-program memory 12 and the decoding of these micro-orders in decoder 14. It is understood that these and other similar functions of the system are performed in the same manner as for existing micro-programed processors, such as for example the programmable control unit (PCU) of the Bunker Ramo Market Decision System 7. The details of applying this invention will vary with the particular microprogrammed processor utilized. Thus, while for the preferred embodiment of the invention, a two word instruction has been utilized, requiring that the execution mode starting address be stored in a temporary register so that the operand may be loaded into MDR, it is apparent that, with a larger MDR and a single word instruction, the decoding of the operation code would be performed at the end rather than at the beginning of the address mode microprogram, eliminating the need for temporarily storing this address. A separate address mode microprogram for each address mode might also be utilized in some applications in place of the single multiple entry point microprogram described above. These and other modifications could be made in the form and details of the described method and apparatus by those skilled in the art without departing from the spirit and scope of the invention.

What is claimed is:

1. In a microprogrammed processor, having a memory storing a plurality of instructions, each instruction including an operation code, an address mode tag, and an operand, improved means responsive to the address mode tag of an instruction for initiating the execution of a selected address mode microprogram to locate the effective operand of the instruction, comprising:

a microprogram memory containing both address mode microprogram micro-orders for controlling the obtaining of the effective operand for an instruction in each of the address modes from the instruction operand, and an operation code micro-program for each operation code for controlling the execution of the instruction;

means for controlling the sequential reading out of micro-orders of each microprogram from said microprogram memory, said means including a microprogram register for addressing said microprogram memory;

decoder means operative in response to the address mode tag of an instruction for generating the address of an entry point of a corresponding address mode microprogram in said microprogram memory for use to control the obtaining of the effective operand for the address mode indicated by the tag, said decoder means also being operative in response to the operation code of an instruction for generating the starting address of a corresponding operation code microprogram in said microprogram memory for controlling the execution of the operation indicated by instruction operation code;

means operative for each instruction for applying the address mode tag of the instruction to said decoder means and for then applying the operation code of the instruction to the decoder means;

means for applying the address mode microprogram entry point address read out from said decoder means in response to said tag to said microprogram register;

a temporary register; and means for storing the operation code microprogram starting address read out from said decoder means in response to said operation code in said temporary register.

2. A system as claimed in claim 1 including means operative when operation code execution of the microprogram for controlling the execution of the operation indicated by the instruction operation code is to begin operation code for transferring the microprogram starting address in the temporary register to the microprogram register.

3. A system as claimed in claim 1 wherein said means applying the address mode tag of the instruction to said decoder means includes a switch which blocks the application of the operation code to the decoder means when the address mode tag is to be applied to the decoder means.

4. In a microprogramed processor, having a memory storing a plurality of instructions, each instruction including an operation code, an address mode tag, and an operand, improved means responsive to the address mode tag of an instruction for initiating the execution of a selected address mode microprogram to locate the effective operand of the instruction, comprising:

a microprogram memory storing a plurality of different address mode microprograms, each address mode microprogram comprising a plurality of micro-orders for controlling the obtaining of the effective operand for an instruction;

means for controlling the sequential reading out of micro-orders of each address mode microprogram from said microprogram memory, said means including a microprogram register for addressing said microprogram memory;

decoder means operative in response to the address mode tag of an instruction for generating the address of an entry point of a corresponding address mode microprogram in said microprogram memory for use to control the obtaining of the effective operand for the address mode indicated by the tag;

means operative for each instruction for applying the address mode tag of the instruction to said decoder means; and means applying the microprogram entry point address read out from said decoder in response to said micro-program register to initiate the execution of the address mode microprogram micro-orders for the selected address mode, wherein said microprogram memory also contains an operation code microprogram for each operation code for controlling the execution of the instruction:

wherein said decoder means is also operative in response to the operation code of an instruction for generating the starting address in said microprogram operation code memory of the microprogram for controlling the execution of the operation indicated by the code;

and including means for sequentially applying the address mode tag of an instruction and the operation code of the instruction to said decoder means.

5. A system as claimed in claim 4 including a temporary register; and operation code means for storing the microprogram starting address read out from said decoder in response to said operation code in said temporary register.

6. A system as claimed in claim 5 including means operative operation code when execution of the microprogram for controlling the execution of the operation indicated by the instruction operation code is to begin for transferring the microprogram starting address in the temporary register to the microprogram register.

7. A system as claimed in claim 4 wherein said means for applying the address mode tag of the instruction to said decoder means includes a switch which blocks the application of the operation code to the decoder means when the address mode tag is to be applied to the decoder means.

* * * * *